3,328,403
3-PHENYL SUBSTITUTED - 1 - ACETAMIDO-
PYRIDAZONE DERIVATIVES AND THEIR
PREPARATION
Yoshihiro Nitta, Komae-machi, Tokyo, Akitoshi Shioya,
Fujimi-machi, and Fumio Yoneda, Chigasaki-shi, Japan,
assignors to Chugai Seiyaku Kabushiki Kaisha, Tokyo,
Japan, a corporation of Japan
No Drawing. Filed Dec. 15, 1964, Ser. No. 418,556
Claims priority, application Japan, Dec. 23, 1963,
38/69,369
1 Claim. (Cl. 260—250)

The present invention relates to new pyridazinone derivatives and also to a process for the production of them having the general formula:

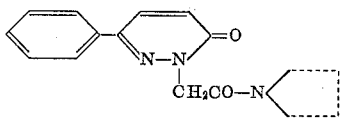

wherein

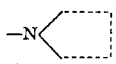

stands for lower dialkylamino group, lower dialkenylamino group or cyclic imine residue with or without oxygen atom, sulfur atom or nitrogen atom in the ring. The products obtained by the process of the present invention are useful as medicines, for example, antalgic, antiphlogistic, sedative and antispasmodic agents.

According to the present invention the desired products may be obtained by reacting an amine represented by the general formula:

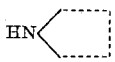

(same meaning as mentioned above) with a substituted compound of 2 - [6 - phenyl-3-oxo-(2H)-pyridazin-2-yl]-acetic acid represented by the general formula:

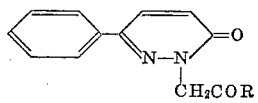

wherein R stands for lower alkoxy radical or halogen atom.

The present reaction may be represented by the following chemical reaction formula.

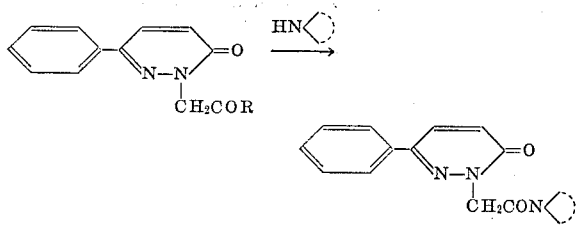

The reaction may be advantageously carried out in a solvent but the use of the solvent is not always necessary. For the solvent, benzene, toluene etc., in general, may be mentioned and further in the reaction of acid ester alcohols may be utilized. The reaction is not always provided under the reacting condition, but in the reaction of acid ester it is preferable to be carried out at comparative high temperature and pressure to reduce the reaction time and to improve the yield. And also in the reaction of acid halogenide the reaction proceeds fully at room temperature but the reaction time may be reduced by heating.

An acid halogenide which is one of the starting materials may be obtained by subjecting 2-[6-phenyl-3-oxo-(2H)-pyridazin-2-yl]-acetic acid to halogenation with halogenation agent such as thionyl chloride, phosphorus oxychloride, phosphorus pentachloride and the like.

Among these halogenation agents, thionyl chloride is generally used to give one in high yield. And this one may be used as it is, without purification, after distilling off of excess thionyl chloride to give the objective substance by the reaction with amines.

An acid ester which is another starting material may be obtained by causing lower alkyl halogeno acetate to react with 6-phenyl-3(2H)-pyridazinone in the presence of alkali as shown in the following chemical reaction formula:

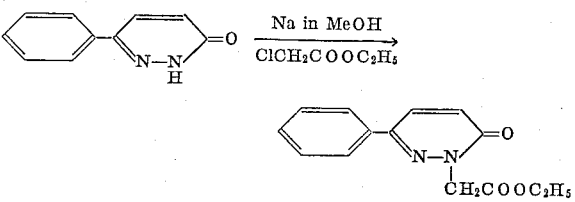

Example 1

50 cc. of toluene solution containing 3 g. of dimethylamine was added to 5 g. of ethyl 2-[6-phenyl-3-oxo-(2H)-pyridazin-2-yl]-acetate and the mixture was heated in a sealed tube at 150° C. for 5 hours. After cooling toluene was distilled off and the residue was subjected to recrystallization from a mixed solution of iso-propyl ether and methanol to give 3 g. of 2-[6-phenyl-3-oxo-(2H)-pyridazin-2-yl]-N,N-dimethylacetamide, colorless needles, M.P. 131° C.

Elemental analysis as $C_{14}H_{15}O_2N_3$— Calc.: C, 65.37%; H, 5.84%; N, 16.34%. Found: C, 65.43%; H, 5.90%; N, 16.50%.

Example 2

4 g. of dipropylamine was added to 5 g. of ethyl 2-[6-phenyl-3-oxo-(2H)-pyridazin-2-yl]-acetate and the mixture was heated in a sealed tube at 120° C. for 3 hrs. Recrystallization of the reaction product from a mixed solution of water and methanol gave 3 g. of 2-[6-phenyl-3-oxo-(2H)-pyridazin-2-yl]-N,N-dipropylacetamide, colorless needles, M.P. 144–146° C.

Elemental analysis as $C_{18}H_{23}O_2N_3$—Calc.: C, 68.98%; H, 7.40%; N, 13.41%. Found: C, 68.91%; H, 7.45%; N, 13.63%.

Example 3

4 g. of diallylamine was added to 5 g. of ethyl 2-[6-phenyl-3-oxo-(2H)-pyridazin-2-yl]-acetate and the mixture was heated in a sealed tube at 150° C. for 5 hrs. Recrystallization of the reaction product from a mixed solution of water and methanol gave 3 g. of 2-[6-phenyl-3-oxo-(2H)-pyridazin-2-yl]-N,N-diallylacetamide, colorless plates, M.P. 102–104° C.

Elemental analysis as $C_{18}H_{19}O_2N_3$—Calc.: C, 69.88%; H, 6.19%; N, 13.53%. Found: C, 69.79%; H, 6.09%; N, 13.42%.

Example 4

4 g. of methyl 2-[6-phenyl-3-oxo-(2H)-pyridazin-2-yl]-acetate and 3 g. of diallylamine were dissolved in 100 cc. of xylol and the mixture was heated in a sealed tube at 180° C. for 20 hrs. After cooling xylol was distilled off under reduced pressure and the residue was subjected to recrystallization from isopropyl ether to give 3 g. of 2-[6-phenyl - 3 - oxo - (2H) - pyridazin-2-yl]-N,N-diallylacetamide.

Example 5

5 g. of ethyl 2-[6-phenyl-3-oxo-(2H)-pyridazin-2-yl]-acetate and 4 g. of piperidine were dissolved in 100 cc. of ethanol and the mixture was heated in a sealed tube at 160–170° C. for 5 hrs. After cooling ethanol was distilled off and the residue was subjected to recrystallization from a mixed solution of isopropyl ether and methanol to give 5 g. of N-[2-(6-phenyl-3-oxo-(2H)-pyridazin-2-yl)-acetyl]-piperidine, colorless prisms, M.P. 158° C.

Elemental analysis as $C_{17}H_{19}O_2N_3$—Calc.: C, 68.66%; H, 6.44%; N, 14.13%. Found: C, 68.58%; H, 6.34%; N, 14.32%.

Example 6

5 g. of ethyl 2-[6-phenyl-3-oxo-(2H)-pyridazin-2-yl]-acetate and 4 g. of morpholine were dissolved in 100 cc. of ethanol. The mixture was treated in the same manner as in Example 5. Recrystallization from a mixed solution of isopropyl ether and methanol gave 4 g. of N-[2-(6-phenyl - 3 - oxo-(2H)-pyridazin-2-yl)-acetyl]-morpholine, colorless small plates, M.P. 175° C.

Elemental analysis as $C_{16}H_{17}O_3N_3$—Calc.: C, 64.20%; H, 5.72%; N, 14.06%. Found: C, 64.50%; H, 5.71%; N, 14.15%.

Example 7

5 g. of 2-[6-phenyl-3-oxo-(2H)-pyridazin-2-yl]-acetic acid was added to 100 cc. of $SOCl_2$. After reflux under heating for 1 hr., excess of $SOCl_2$ was distilled off under reduced pressure. The residue was added with benzene solution containing 5 g. of dipropylamine and was subjected to reflux under heating for 3 hrs. on a water bath. After cooling dipropylamine hydrochloride deposited was filtered off and the filtrate was evaporated to dryness. The residue was subjected to recrystallization from a mixed solution of water and methanol to give 3.5 g. of 2-[6-phenyl - 3-oxo - (2H)-pyridazin-2-yl]-N,N-dipropylacetamide, colorless needles, M.P. 145° C.

Elemental analysis as $C_{18}H_{23}O_2N_3$—Calc.: C, 68.98%; H, 7.40%; N, 13.41%. Found: C, 68.95%; H, 7.60%; N, 13.59%.

Example 8

5 g. of 2-[6-phenyl-3-oxo-(2H)-pyridazin-2-yl]-acetic acid was added to 100 cc. of $SOCl_2$. After reflux under heating for 1 hr., excess of $SOCl_2$ was distilled off under reduced pressure. The residue was added with benzene solution containing 4 g. of piperidine and treated in the same manner as in Example 1. Recrystallization from a mixed solution of isopropyl ether and methanol gave 3 g. of N - [2 - (6-phenyl-3-oxo-(2H)-pyridazin-2-yl)-acetyl]-piperidine, colorless prisms, M.P. 158° C.

Elemental analysis as $C_{17}H_{19}O_2N_3$—Calc.: C, 68.66%; H, 6.44%; N, 14.13%. Found: C, 68.58%; H, 6.34%; N, 14.32%.

Example 9

5 g. of 2-[6-phenyl-3-oxo-(2H)-pyridazin-2-yl]-acetic acid was added to 100 cc. of $SOCl_2$. After reflux for 1 hr., excess of $SOCl_2$ was distilled off under reduced pressure. The residue was added with benzene solution containing 4 g. of morpholine and treated in the same manner as in Example 1. Recrystallization from a mixed solution of isopropyl ether and methanol gave 4.2 g. of N-[2-(6-phenyl - 3 - oxo-(2H)-pyridazin-2-yl)-acetyl]-morpholine, colorless plates, M.P. 175° C.

Elemental analysis as $C_{16}H_{17}O_3N_3$—Calc.: C, 64.20%; H, 5.72%; N, 14.06%. Found: C, 64.49%; H, 5.69%; N, 14.18%.

Example 10

5 g. of 2-[6-phenyl-3-oxo-(2H)-pyridazin-2-yl]-acetic acid was added to 100 cc. of $SOCl_2$. After reflux for 1 hr., excess of $SOCl_2$ was distilled off under reduced pressure. The residue was added with benzene solution containing 3 g. of dimethylamine and treated in the same manner as in Example 1. Recrystallization from a mixed solution of water and methanol gave 3 g. of 2-[6-phenyl-3-oxo-(2H)-pyridazin-2-yl]-N,N-dimethylacetamide, colorless needles, M.P. 131° C.

Elemental analysis as $C_{14}H_{15}O_2N_3$—Calc.: C, 65.37%; H, 5.84%; N, 16.34%. Found: C, 65.44%; H, 5.90%; N, 16.52%.

Example 11

5 g. of 2-[6-phenyl-3-oxo-(2H)-pyridazin-2-yl]-acetic was added to 100 cc. of $SOCl_2$. After reflux for 1 hr., excess of $SOCl_2$ was distilled off under reduced pressure. The residue was added with benzene solution containing 5 g. of diallylamine. The mixture was subjected to reflux under heating for 5 hrs. on a water bath and treated in the same manner as in Example 1. Recrystallization from water and methanol gave 2.5 g. of 2-[6-phenyl-3-oxo-(2H) - pyridazin - 2 - yl]-N,N-diallylacetamide, colorless small plates, M.P. 102–104° C.

Elemental analysis as $C_{18}H_{19}O_2N_3$—Calc.: C, 69.88%; H, 6.19%; N, 13.53%. Found: C, 69.99%; H, 6.09%; N, 13.42%.

We claim:
2-[6-phenyl-3(2H)-pyridazinoyl]-diallylacetamide.

References Cited

UNITED STATES PATENTS

| | | | |
|---|---|---|---|
| 2,712,542 | 7/1955 | King et al. | 260—250 |
| 3,017,411 | 1/1962 | Engelbrecht et al. | 260—247.2 |

FOREIGN PATENTS

| | | |
|---|---|---|
| 858,792 | 1/1961 | Great Britain. |

OTHER REFERENCES

Noller: Chemistry of Organic Compounds, Philadelphia, Saunders, 1957; pages 244–245.

ALEX MAZEL, *Primary Examiner.*

HENRY R. JILES, *Examiner.*

J. A. NARCAVAGE, *Assistant Examiner.*